(12) United States Patent
Kobres (10) Patent No.: US 11,172,363 B2
(45) Date of Patent: Nov. 9, 2021

(54) TECHNIQUES FOR AUTOMATED TRANSACTIONS

(75) Inventor: Erick Kobres, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 1371 days.

(21) Appl. No.: 13/285,359

(22) Filed: Oct. 31, 2011

(65) Prior Publication Data

US 2013/0110728 A1 May 2, 2013

(51) Int. Cl.
| | |
|---|---|
| H04W 12/10 | (2021.01) |
| G06Q 30/06 | (2012.01) |
| G09C 5/00 | (2006.01) |
| H04L 9/32 | (2006.01) |
| H04W 12/77 | (2021.01) |

(52) U.S. Cl.
CPC ............ *H04W 12/10* (2013.01); *G06Q 30/06* (2013.01); *G09C 5/00* (2013.01); *H04L 9/3247* (2013.01); *H04L 2209/80* (2013.01); *H04W 12/77* (2021.01)

(58) Field of Classification Search
USPC .......................................................... 705/75
See application file for complete search history.

(56) References Cited

U.S. PATENT DOCUMENTS

| | | | | |
|---|---|---|---|---|
| 6,422,462 | B1 * | 7/2002 | Cohen ................... | G06Q 20/105 235/380 |
| 7,349,871 | B2 * | 3/2008 | Labrou et al. ............. | 705/26.35 |
| 7,644,039 | B1 * | 1/2010 | Magee ............... | G06Q 20/1085 221/9 |
| 8,793,588 | B2 * | 7/2014 | DiPietro ............... | G06F 3/0416 705/26.7 |
| 2002/0048369 | A1 * | 4/2002 | Ginter ..................... | G06F 21/10 380/277 |
| 2003/0046401 | A1 * | 3/2003 | Abbott .................... | G06F 9/451 709/228 |
| 2003/0097331 | A1 * | 5/2003 | Cohen ............................ | 705/39 |
| 2005/0137986 | A1 * | 6/2005 | Kean ............................. | 705/65 |
| 2006/0064380 | A1 * | 3/2006 | Zukerman ..................... | 705/44 |
| 2007/0221726 | A1 * | 9/2007 | Thomas ................ | G06Q 30/06 235/383 |
| 2008/0046366 | A1 * | 2/2008 | Bemmel et al. ................. | 705/44 |
| 2008/0215694 | A1 * | 9/2008 | Chen ....................... | H04L 51/36 709/206 |
| 2008/0313062 | A1 * | 12/2008 | Williams et al. ............... | 705/30 |
| 2009/0108057 | A1 * | 4/2009 | Mu .................... | H04M 1/72561 235/375 |
| 2009/0265252 | A1 * | 10/2009 | Fletcher ............ | G06Q 30/0601 705/26.1 |

(Continued)

*Primary Examiner* — Zeshan Qayyum
*Assistant Examiner* — Yingying Zhou
(74) *Attorney, Agent, or Firm* — Schwegman, Lundberg & Woessner (57) ABSTRACT

Techniques for automated transactions are provided. A customer uses a mobile device to interact with an enterprise automation terminal to perform a transaction. At the start of the transaction, a unique barcode for the transaction is generated and displayed to the customer. The mobile device scans the barcode (can be a QR code); this causes the mobile device to communicate with a remote server that identifies the customer. Preferences for the customer are retrieved and the transaction and features of the terminal are configured based on the preferences. The transaction proceeds with the configured preferences.

6 Claims, 4 Drawing Sheets

(56) References Cited

U.S. PATENT DOCUMENTS

2011/0251892 A1\* 10/2011 Laracey ............ G06Q 30/0253
   705/14.51
2012/0095853 A1\* 4/2012 von Bose ........... G06Q 30/0633
   705/16

\* cited by examiner

TECHNIQUES FOR AUTOMATED TRANSACTIONS

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, WiFi communication, and the like.

So, increasingly customers are engaging in a variety of technologies to automatically interact with enterprises to perform transactions. The transactions may result in purchases or may result in such things as registration for loyalty programs, enrolling in promotional events, requesting additional information for a good or service, and others. That is, the transactions via these kiosks are not strictly tied to purchases although some transactions are purchase related.

One problem with the variety of existing mechanisms used to interact with customers is that often the customers are required to enter a variety of identifying information or other information before a transaction can complete. Each mechanism may also have its own interface screens and requirements. This can be time consuming and can deter customers from participating in automation with an enterprise because customers are often driven by ease of use associated with the automation and because customers want automated transactions to be seamless and quick.

SUMMARY

In various embodiments, techniques for automated transactions with an enterprise are presented. According to an embodiment, a method for an automated transaction with an enterprise system is provided.

Specifically, a request for a unique transaction code is received and the unique transaction code is generated. The unique transaction code is then transmitted to a terminal device and customized for the terminal device. Next, the unique transaction code is re-acquired along with a mobile device identifier for a mobile device. A customer identity is obtained using the mobile device identifier and preference data for the transaction acquired using the customer identity. Finally, the preference data is sent to the terminal device from a server device to customize the transaction identified by the unique transaction code. The transaction commences between the consumer, via the mobile device, and the terminal device.

DETAILED DESCRIPTION

Figure 1:
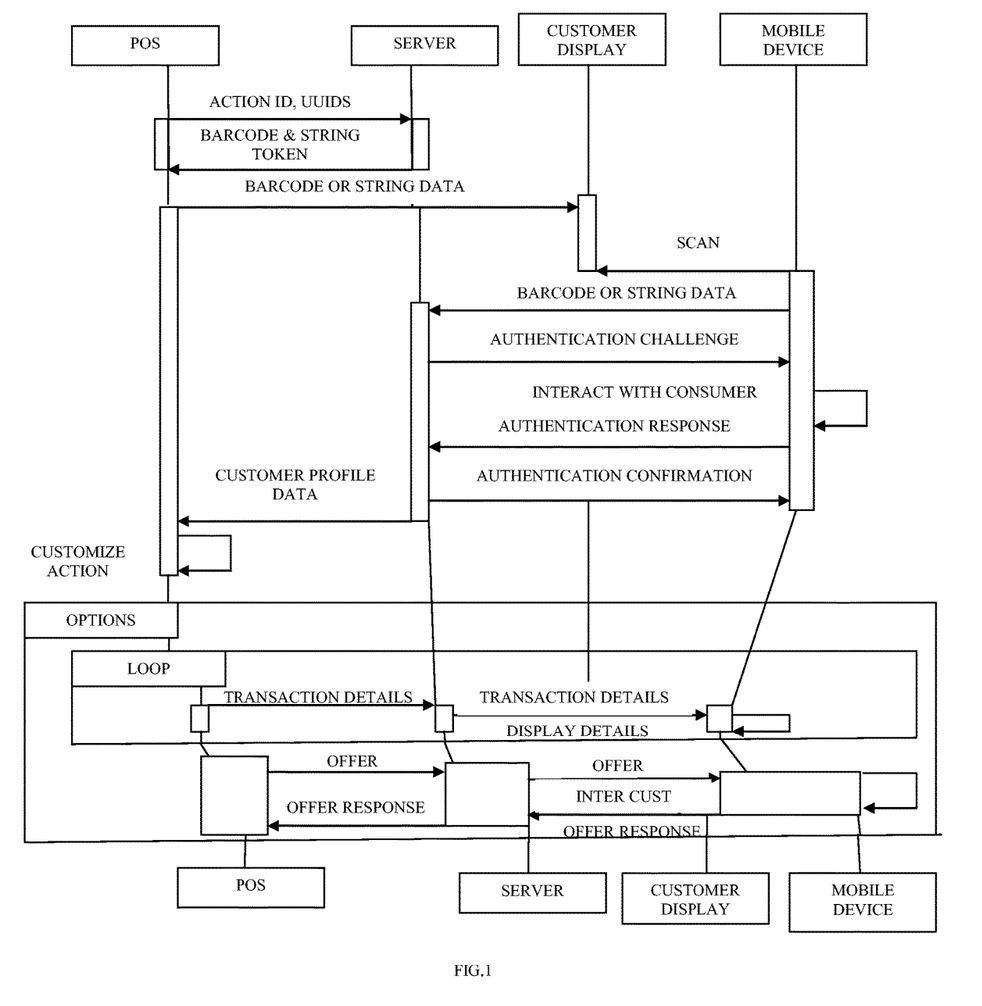
FIG. 1 is a flow diagram for conducting an automated transaction with an enterprise system, according to an example embodiment.

FIG. 1 is a flow diagram for conducting an automated transaction with an enterprise system, according to an example embodiment. The components of the diagram are implemented in non-transitory computer-readable storage medium for execution on one or more processing devices that are configured to execute the components. The components are also enabled to operate and communicate with one another over a network. The network can be wired, wireless, or a combination of wired and wireless.

It is noted that the components and the interactions of the components shown in the FIG. 1 are presented for illustrative purposes in a sample scenario with a sample enterprise system. So, other arrangements and interactions of the components are possible without departing from the beneficial teachings presented herein and below.

As will be more fully explained herein and below, the techniques and embodiments presented below provide a novel mechanism to enable a consumer to present their loyalty information or preferences for a transaction at a point of service without requiring a loyalty card, Near Field Communication (NFC) tap, or an imaging scanner to read a barcode off of the phone.

Instead, the Point-Of-Sale (POS) terminal presents a two dimensional (2D) barcode to the consumer (as used herein and below a barcode also includes a Quick Response (QR code); the customer scans the barcode with their mobile device (such as a mobile phone, tablet, personal digital assistant, etc.), accomplishing the same end result—that links a current transaction with the consumer's loyalty account. This also establishes a link between the consumer's mobile device and the transaction—such that the mobile device can be used as a User Interface (UI) to allow the customer (the terms "customer," "consumer," and "user" may be used interchangeably and synonymously herein) to answer questions, redeem points, receive electronic receipts or transaction records, receive target offers, and the like, via their mobile device.

The linkage is achieved by: a registration token previously provided by a retailer and securely stored on the mobile device and perhaps signed by the retailer, the mobile device, and/or the consumer for security; the customer's mobile phone number; and/or Media Access Control (MAC) identifier for the mobile device being preregistered with the customer's loyalty account. It is noted that multiple registration tokens, phone numbers, and/or MAC addresses can be registered with a same loyalty account. This may be particularly useful for a household having multiple members sharing a loyalty account and for customers that utilize a variety of mobile devices.

So, initially before a transaction begins with a customer, the POS System securely communicates over a network (Internet, cell, satellite, Wide Area, Local Area, and others) with a preference configuring service with a transaction Identifier (ID), unique location ID for the POS system and any other relevant information about the transaction.

The preference configuring service returns a barcode and string data containing a portal Uniform Resource Locator (URL) or Uniform Resource Identifier (URI) link along with the unique transaction ID, which can be digitally signed with a private key of the retailer for added security. It is noted that a barcode is an encoded version of string data. So, the preference configuring service returns some encoded data to the POS system and the exact format can be configurable to what is supported or what is desired on the POS system.

The POS system displays the barcode to the customer via a POS terminal display (can be on a display of a cashier, on a display of an automated self-service checkout terminal, on a digital sign, and others); loads NFC data or otherwise presents the barcode or string such that the consumer's mobile device can acquire the string. So, if NFC communications are enabled string data is pushed to the mobile device of the customer by the POS system and automatically processed and optionally displayed on the customer's mobile device.

The POS system contacts the preference configuring service and enters a state of abeyance, awaiting loyalty information and/or profile/preference data. In other words, the POS system acquired a unique barcode from the preference configuring service for a unique transaction that is about to occur and then waits until the POS system hears back from the preference configuring service with the loyalty and/or profile/preference data from a specific customer that is to engage in the transaction with the POS system.

Next, a consumer approaches the POS system and acquires the barcode having the URL/URI string (used to contact the preference configuring service). Acquisition can occur by using a barcode scanner on the consumer's mobile device to scan the barcode off a display associated with the POS system or can occur via a NFC tap or other mechanism.

An application (app) on the mobile device then automatically contacts the preference configuring service via a secure connection, either through existing Over-The-Air (OTA) data connection, WiFi, Short Message Service (SMS) or other mechanism by presenting the string. It is noted that an existing app on the mobile device can provide the connection or a specialized app can be automatically downloaded and installed on the mobile device if upon contacting the preference configuring service it is detected that one is needed and missing from the mobile device.

Optionally and in some embodiments, the consumer also authenticates, via his/her mobile device with a secret, such as a Personal Identification Number (PIN), secure element token, biometrics or other mechanism. Such authentication can be configured based on the preference configuring service, the enterprise associated with the POS system, and/or the customer. So, there may be no authentication required for some POS systems, different authentication mechanisms for different POS systems, or a same authentication mechanism based on a specific consumer.

Once the presence of a specific consumer is established (done via registration token (signed or unsigned), the phone number of the mobile device, a MAC address for the mobile device, and/or any authentication mechanism used), the preference configuring service returns loyalty and/or preference/profile data for the specific consumer to the POS system, which is waiting for this new transaction to begin with the preference configuring service. It is noted that while the POS waits it may also be performing other operations, such as administrative or processing other existing transactions that have yet to complete. In fact, in some cases for efficiency the POS system may buffer some predefined number of unique transaction codes that it obtains as soon as an existing transaction completes.

Optionally and in an embodiment, a communication session between the mobile device and the POS system can be used for further interactions on the mobile device related to transacting, such as tendering, coupon redemption, points redemption, etc. during the transaction.

In another case, the POS system sends transaction details during or at the end of the transaction to other third-party services, the preference configuring service, and/or the mobile device. This may permit further interaction with the mobile device for related activities or may even provide receipt details to the mobile device (thereby avoiding any paper printing).

In some cases, the mobile device can maintain a connection to the preference configuring service to receive transaction updates, an electronic receipt or other information related to the transaction.

The FIG. 1 shows a sample flow of the description provided above, where the "Server" refers to the preference configuring service discussed above.

Figure 2:
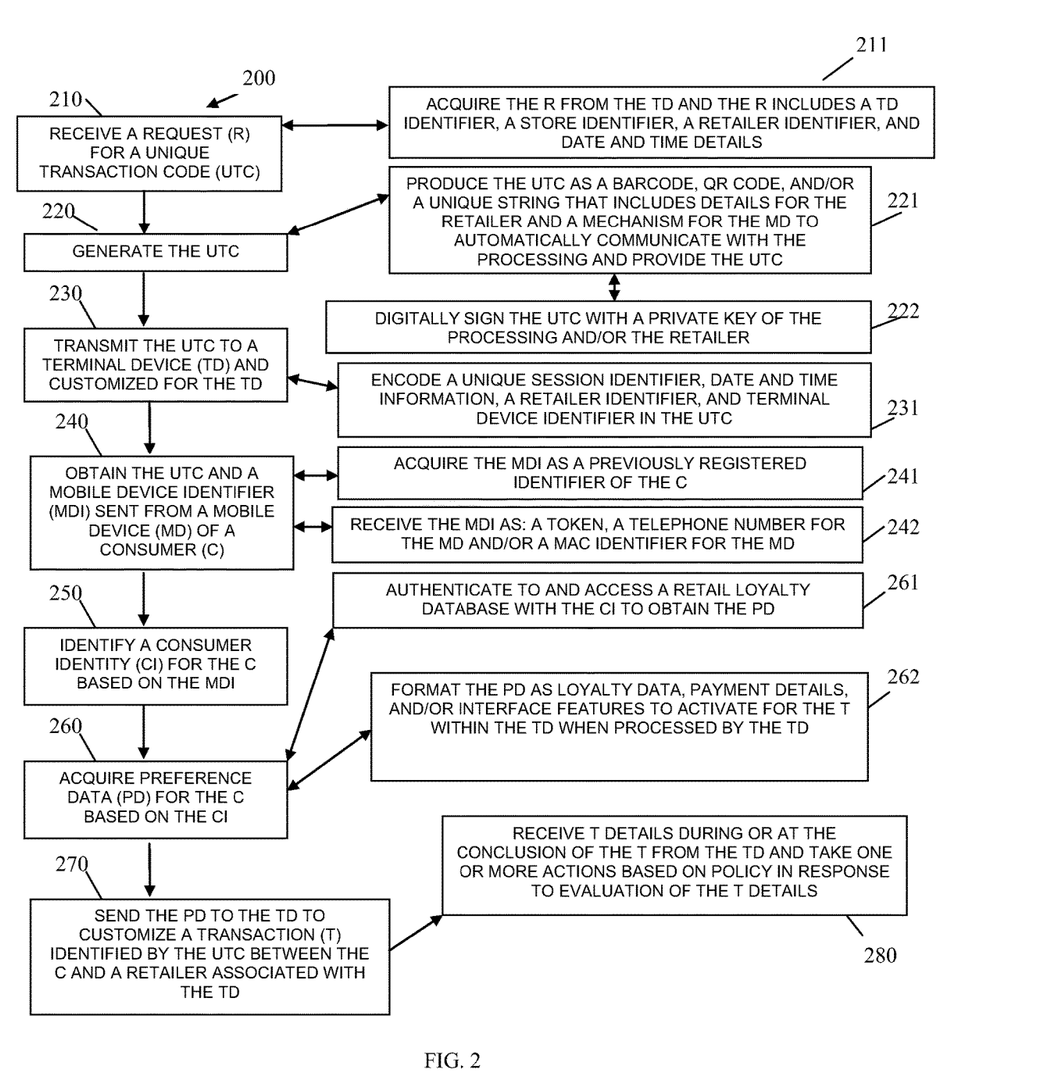
FIG. 2 is a diagram of a method for an automated transaction with an enterprise system, according to an example embodiment.

FIG. 2 is a diagram of a method 200 for an automated transaction with an enterprise system, according to an example embodiment. The method 200 (hereinafter "preference configuring service") is implemented as instructions programmed and residing on a non-transitory computer-readable (processor-readable) storage medium and executed by one or more processors. The processors are specifically configured and programmed to process the preference configuring service. The preference configuring service operates over a network. The network is wired, wireless, or a combination of wired and wireless.

The preference configuring service executes on one or more processors of a server. In some embodiments, the preference configuring service operates in a cloud processing environment and is available as a cloud service over the Internet to enterprises and consumers.

The processing of the preference configuring service interacts with consumer mobile device apps, applications and services of enterprise POS systems, and/or other third-party services utilized by consumers and/or enterprises for transaction processing, loyalty processing, and/or other customer relationship management processing.

At 210, the preference configuring service receives a request for a unique transaction code. This is a code that uniquely identifies and a transaction with a terminal device (cashier-manned terminal, self-service kiosk, digital sign, and perhaps even a web-site driven portal of a retailer). The request is received from an application processing on the terminal device. In some cases, the terminal device automatically generates the request to the preference configuring service at the conclusion of a previous transaction and/or when the application of the terminal device is booted up or turned on. In other case, a manual selected option can generate the request. A policy may also generate the request for a given time of day, such as the opening time of a retail establishment.

According to an embodiment, at 211, the preference configuring service acquires the request from the terminal device (app of the terminal device discussed below with reference to the FIG. 4). The terminal device includes a variety of information with the request, such as and by way of example only, a terminal device identifier, a store identifier (can be website portal identifier or Internet Protocol (IP) address), date and time details, geographic location, and the like.

At 220, the preference configuring service generates the unique transaction code. This can be generated in a variety of formats and with a variety of information.

For example, at 221, the preference configuring service provides the unique transaction code as a barcode, a QR code, and/or a uniquely encoded string of characters. The unique transaction code includes details relevant to the retailer and a mechanism for a mobile device of a consumer to automatically communicate with the preference configuring service and to re-supply the unique transaction code from the mobile device to the preference configuring service. That is, the mechanism is an app of the mobile device (discussed below with reference to the FIG. 3) that is automatically instructed to access an URL identifying the preference configuring service or apps of the preference configuring service; this visit triggers presentation of the unique transaction code and other identifying information for the mobile device to the preference configuring service and triggers additional automated processing discussed herein and below.

Continuing with the embodiment of 221 and at 222, the preference configuring service digitally signs the unique transaction code with a private key of the preference configuring service and/or the retailer (or terminal device). This provides added security to ensure the authenticity of the unique transaction code.

At 230, the preference configuring service transmits the unique transaction code to a terminal device; the unique transaction code customized for the terminal device.

So, for example, at 231, the preference configuring service can encode a unique session identifier, date and time information as to when the unique transaction code was generated by the preference configuring service, and a terminal device identifier into the unique transaction code. Such information and other customizable information can be identified in the unique transaction code for purposes of identifying the terminal device and for tracking, auditing, and perhaps subsequent metric generation for the retailer.

At 240, the preference configuring service obtains the unique transaction code and a mobile device identifier that is sent from the mobile device of the consumer. The mobile device can be a mobile phone, a tablet, a laptop, or the like.

According to an embodiment, at 241, the preference configuring service acquires or identifies the mobile device identifier as a previously registered identifier for the consumer. In instances where the mobile device being used by the consumer was never previously registered, the preference configuring service may engage the consumer via the mobile device to register identifying information for the consumer to register the mobile device identifier. In such a case where preregistration had not previous occurred, the preference configuring service may, as part of the interaction with the consumer, dynamically push and install the mobile app (discussed below with reference to the FIG. 3) to the mobile device for future interaction with the preference configuring service.

In an embodiment, the preference configuring service, at 242, acquires the mobile device identifier as previously acquired registration token (signed (single party or multi-party signed) or unsigned). The preference configuring service may also acquire the mobile device identifier as a mobile telephone number when the mobile device is a phone. In some cases where the mobile device is not a phone, such as when the device is a tablet or other portable device, the preference configuring service can acquire the mobile device identifier as a media access control (MAC) identifier that uniquely identifies the device. For added security, the preference configuring service can acquire the mobile device identifier as some combination of all of the above mentioned items (registration token (signed or unsigned), mobile phone number, and/or MAC identifier).

At 250, the preference configuring service identifies a consumer identity for the consumer based on the acquired mobile device identifier.

At 260, the preference configuring service acquires preference data for the consumer based on the consumer identity. Preference data can includes a variety of customized information relevant to the transaction and the terminal device, such as but not limited to loyalty details for a loyalty program of the retail establishment, payment preferences, payment data, features of the interface associated with the terminal device desired by the consumer during a transaction, such as: consumer-driven and desired spoken/written language, left handed or right handed attributes of the consumer, audio volume for hearing impaired consumers, voice-driven menus for sight impaired consumers, large font for text used in a display of the terminal device, confirmation screens, and the like.

According to an embodiment, at 261, the preference configuring service authenticates to and accesses a retail loyalty database with the consumer identity to obtain the preference data. In this manner, the preference configuring service can service multiple different retail establishments and terminal devices because the preference data is housed and managed externally from an environment of the preference configuring service. Policy may also instruct the preference configuring service how to format the preference data for the proper terminal device. This also permits a single consumer to have different preference data for different retail establishments. However, it is noted in some instances the preference configuring service may also manage the preference data on behalf of the consumer and/or retail establishments.

In another case, at 262, the preference configuring service formats the preference data as loyalty data, payment details, and/or interface features (as discussed above) for purposes of activating customized profiles and preferences for the transaction within the terminal device when the transaction is ultimately processed by the terminal device.

Finally, at 270, the preference configuring service sends the preference data to the terminal device to customize the transaction identified by the unique transaction code between the consumer and a retailer associated with the terminal device.

According to an embodiment, at 280, the preference configuring service subsequently receives transaction details during or at the conclusion of the transaction from the terminal device. In response to evaluating these details, the preference configuring service can take a variety of automated actions based on configured policies, such as sending an electronic receipt to the mobile device, updating a customer relationship management database for the retailer, sending a coupon to the mobile device for subsequent transactions, sending offers for goods and services to the mobile device, and the like.

Figure 3:
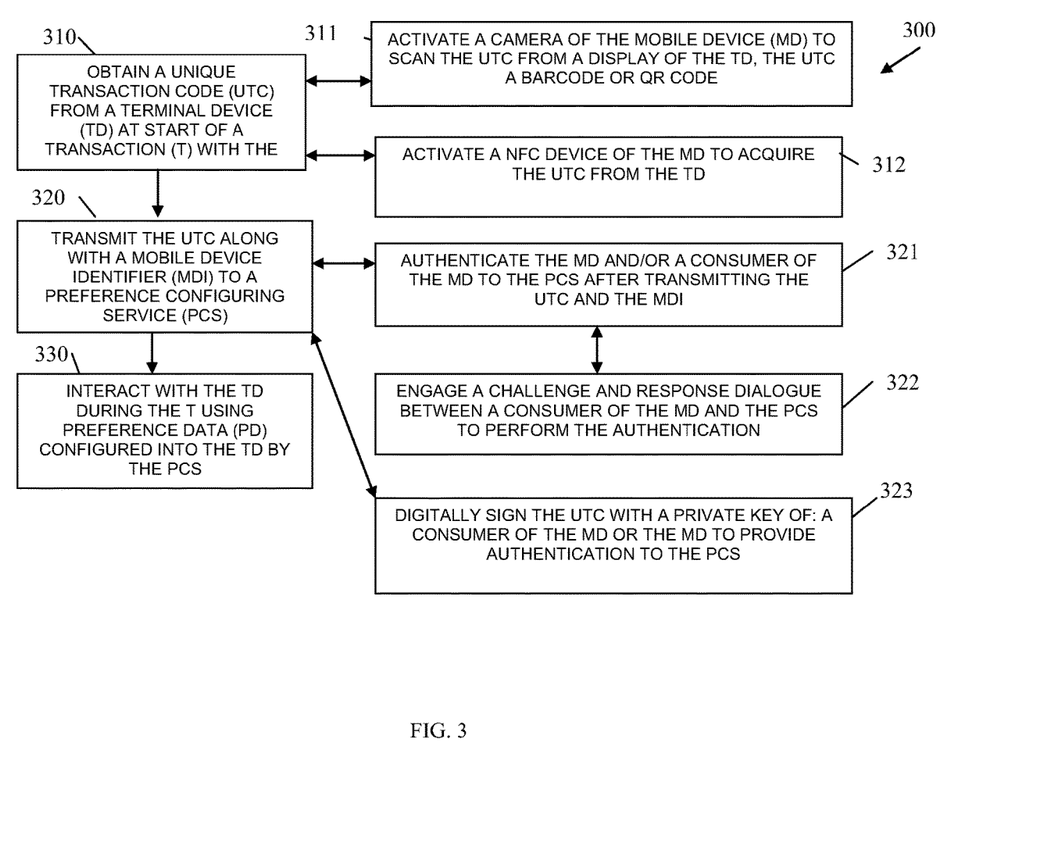
FIG. 3 is a diagram of another method for an automated transaction with an enterprise system, according to an example embodiment.

FIG. 3 is a diagram of another method 300 for an automated transaction with an enterprise system, according to an example embodiment. The method 300 (hereinafter "mobile app") is implemented as instruction and programmed within a non-transitory computer-readable (processor-readable) storage medium that executes on one or more processors of a mobile device (e.g., mobile phone, personal digital assistant (PDA), tablet, laptop, etc.); the processors of the mobile device are specifically configured to execute the mobile app. The mobile app is operational over a network; the network is wired, wireless, or a combination of wired and wireless.

The mobile app is controlled by a consumer (customer and/or user) and interacts with the preference configuring service, represented by the method 200 of the FIG. 2 and may also interact with an enterprise POS system (discussed below with reference to the FIG. 4).

It is noted that the mobile app can be installed and initiated by the consumer on the mobile device in a variety of manners before the processing occurs as detailed below. For instance, in one situation during a registration process of the mobile device with a preference configuring service (such as the one discussed above with reference to the FIG. 2), the mobile app is downloaded and initiated on the mobile device. In another instance, during an initial contact by the mobile device by activating a QR code for a first time that represents a unique transaction code for a retailer, the preference configuring service is automatically contacted and downloads and installs on the mobile device and initiates a registration process. The remaining processing described for the mobile app assumes the mobile app is installed and executing on a mobile device of a consumer.

At 310, the mobile app obtains a unique transaction code from a terminal device at a start of a transaction with the terminal device. The generation of this unique transaction code was discussed in detail above with reference to the FIGS. 1 and 2.

In an embodiment, at 311, the mobile app activates a camera of the mobile device to scan the unique transaction code from a display of the terminal device. In this case, the unique transaction code is a barcode or QR code that is unique for this transaction and this terminal device.

In another situation, at 312, the mobile app activates a NFC device for the mobile device to acquire the unique transaction code from the retailer terminal.

At 320, the mobile app transmits the unique transaction code along with a mobile device identifier to a preference configuring service, such as the preference configuring service represented by the method 200 of the FIG. 2.

According to an embodiment, at 321, the mobile app authenticates the mobile device and/or a consumer of the mobile device to the preference configuring service after transmitting the unique transaction code and the mobile device identifier. Again, the mobile device identifier can be: a registration token (signed or unsigned), a mobile phone number, a MAC identifier, a combination of these items, or all of these items.

Continuing with the embodiment of 321 and at 322, the mobile app engages a challenge and response dialogue between the consumer of the mobile device and the preference configuring service to perform the authentication.

In still another case, at 323, the mobile app digitally signs the unique transaction code with a private key of: the consumer of the mobile device and/or the mobile device to provide authentication to the preference configuring service.

At 330, the mobile app interacts with the terminal device during the transaction using preference data configured into the terminal device for the transaction, where the configuration of the preference data was initiated by the preference configuring service as detailed above with reference to the FIGS. 1 and 2.

Figure 4:
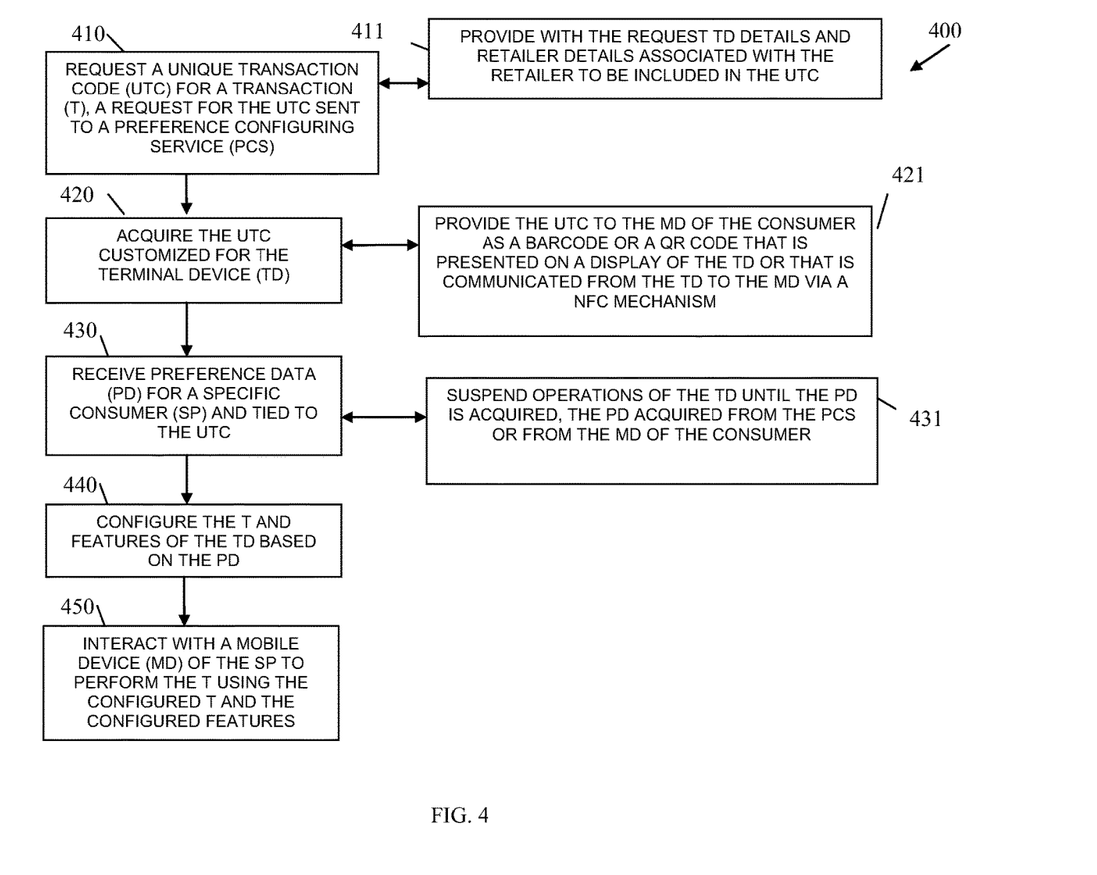
FIG. 4 is a diagram of yet another method for an automated transaction with an enterprise system, according to an example embodiment.

FIG. 4 is a diagram of yet another method 400 for an automated transaction with an enterprise system, according to an example embodiment. The method 300 (hereinafter "terminal device app") is implemented as executable instructions and programmed within a non-transitory computer-readable (processor-readable) storage medium that executes on one or more processors of a terminal device (e.g., cashier-manned device, self-service kiosk, digital sign, web site of a retail, etc.); the processors of the terminal device app are specifically configured to execute the terminal device app. The terminal device app is operational over a network; the network is wired, wireless, or a combination of wired and wireless.

The FIG. 1 described the processing for automating a transaction as a whole. The FIG. 2 described the processing from the perspective of the preference configuring service; the FIG. 3 described the processing from the perspective of the consumer's mobile app on a consumer's mobile device; and the terminal device app of the FIG. 4 describes the processing from an enterprise's POS system processing on a terminal device. A transaction process is automated and customized via the interaction among the preference configuring service (of the FIG. 2), the mobile app (of the FIG. 3), and the terminal device app (of the FIG. 4).

At 410, the terminal device app makes a request for a unique transaction code for a transaction that has yet to take place on a terminal device. The request for the unique transaction code is sent from the terminal device, via the terminal device app, to a preference configuring service (such as the preference configuring service represented by the method 200 of the FIG. 2 and discussed above).

According to an embodiment, at 411, the terminal device app provides with the request terminal device details and retailer details associated with the retailer and which the retailer desires to be included in the unique transaction code.

At 420, the terminal device app acquires the unique transaction code, which is customized for the terminal device.

In an embodiment, at 421, the terminal device app provides the unique transaction code to the mobile device of the consumer as a barcode or a QR code that is presented on a display of the terminal device or that is communicated from the terminal device to the mobile device via a NFC mechanism.

At 430, the terminal device app receives preference data for a specific consumer, which is tied to the unique transaction code.

In one situation, at 431, the terminal device app suspends or temporarily halts operations of the terminal device (related to transaction processing—other administrative operations may still proceed in some situations) until the preference data is acquired from the preference configuring service or from the mobile device of the consumer. So, in some embodiments (although not presented above), the preference configuring service may deliver the preference data to the mobile device app on the mobile device and the mobile device app then provides the preference data to the terminal device app.

At 440, the terminal device app configures the transaction and interface features of the terminal device based on the preference data. Essentially, the transaction that is commencing is customized for the consumer and automated.

Finally, at 450, the terminal device app interacts with the mobile device of the specific consumer to perform the transaction using the configured transaction and the configured features, which were customized using the preference data.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method to execute on processors of a system comprising: a server, a mobile device, and a terminal device, the method, comprising:

registering, by the server, a mobile device of a consumer via a mobile device identifier of the mobile device;

associating, by the server, a secure token with the mobile device identifier based on the registering;

providing, by the terminal device, a request for a unique transaction code to the server, wherein the request comprising a terminal device identifier and a transaction identifier;

receiving, by the server, the request, comprising the terminal device identifier, and the transaction identifier;

generating, by the server, the unique transaction code based on the terminal device identifier;

encoding, by the server, the unique transaction code;

transmitting, by the server, the encoded unique transaction code to the terminal device;

displaying, by the terminal device, the encoded unique transaction code on a display of the terminal device;

obtaining and decoding, by the mobile device, the unique transaction code by scanning the encoded unique transaction code from the display of the terminal device and decoding the encoded unique transaction code;

sending, by the mobile device, the unique transaction code and the mobile device identifier to the server;

obtaining, by the server, the unique transaction code and the mobile device identifier from the mobile device of the consumer;

authenticating, by the server, the mobile device based on the mobile device identifier;

identifying, by the server, a consumer identity for the consumer based on the mobile device identifier for the mobile device;

acquiring, by the server, preference data based on the consumer identity;

formatting, by the server, the preference data into a format based on a policy;

sending, by the server, the formatted preference data to the terminal device; and processing, by the terminal device, the transaction, wherein processing further includes associating the transaction with the unique transaction code;

wherein the processing further includes processing, by the terminal device, the formatted preference data of the consumer by customizing a terminal device interface for the terminal device during the transaction based on the formatted preference data, wherein customizing further includes modifying the terminal device interface to a consumer-driven menus and a voice-driven menus, wherein the consumer-driven menus comprising a written language of the consumer and left-handed or right-handed attributes; wherein the voice-driven menus comprising spoken language of the consumer and an audio volume.

2. The method of claim 1 further comprising, digitally signing, by the server, the unique transaction code with a private key of the retailer.

3. The method of claim 1, wherein generating further includes providing the terminal device identifier with the unique transaction code.

4. The method of claim 1, wherein acquiring further includes authenticating to and accessing a retail loyalty database with the consumer identity and obtaining the preference data.

5. The method of claim 1, wherein acquiring further includes providing the preference data as interface features of the terminal device interface.

6. The method of claim 1 further comprising, receiving, at the server, transaction details during or at the conclusion of the transaction from the terminal device and taking one or more actions based on a second policy.

* * * * *